United States Patent
Johnson et al.

(10) Patent No.: US 6,786,138 B2
(45) Date of Patent: Sep. 7, 2004

(54) DEVICE FOR PREPARING MILK FROTH FOR CAPPUCCINO

(75) Inventors: Michael W. Johnson, St. Helens, OR (US); David Wheeler, Portland, OR (US)

(73) Assignee: Boyd Coffee Company, Portland, OR (US)

( * ) Notice: Subject to any disclaimer, the term of this patent is extended or adjusted under 35 U.S.C. 154(b) by 0 days.

(21) Appl. No.: 10/251,517

(22) Filed: Sep. 19, 2002

(65) Prior Publication Data

US 2003/0131735 A1 Jul. 17, 2003

Related U.S. Application Data

(60) Provisional application No. 60/374,108, filed on Apr. 19, 2002, and provisional application No. 60/350,306, filed on Jan. 16, 2002.

(51) Int. Cl.[7] .............................. A47J 31/40; A47J 31/44
(52) U.S. Cl. ......................... 99/323.1; 99/293; 141/82; 261/DIG. 76
(58) Field of Search ............................ 99/323.1, 293; 141/70, 82; 261/DIG. 16, DIG. 76, 76

(56) References Cited

U.S. PATENT DOCUMENTS

| | | | |
|---|---|---|---|
| 4,735,133 A | * | 4/1988 | Paoletti ...................... 99/454 |
| 4,949,631 A | | 8/1990 | Fregnan |
| 5,335,588 A | | 8/1994 | Mahlich |
| 5,372,061 A | * | 12/1994 | Albert et al. ................. 99/281 |
| 5,464,574 A | * | 11/1995 | Mahlich ..................... 261/124 |
| 5,738,002 A | | 4/1998 | Marano-Ducarne |
| 5,768,975 A | | 6/1998 | Wu |
| 5,768,981 A | | 6/1998 | Cicchetti |
| 5,769,135 A | | 6/1998 | Mahlich |
| 5,862,740 A | | 1/1999 | Grossi |
| 6,644,177 B1 | * | 11/2003 | Hsu ............................ 99/453 |

* cited by examiner

*Primary Examiner*—Reginald L. Alexander
(74) *Attorney, Agent, or Firm*—Kolisch Hartwell, P.C.

(57) ABSTRACT

A device for heating and frothing a beverage, the device including an elongate frothing wand includes a generally tubular external sleeve, an inner core within the external sleeve, wherein the inner core defines a steam conduit configured to pass steam from a supply end of the frothing wand to an expulsion end of the frothing wand, a steam-discharge ring in fluid communication with the steam conduit and configured to eject steam into the beverage, an annular airway defined by the external sleeve and the inner core, wherein the airway is configured to draw air from the supply end to the expulsion end of the frothing wand, and an air-discharge ring in fluid communication with the airway and concentrically aligned with the steam-discharge ring, wherein the air-discharge ring is configured to direct air into the beverage upon ejection of steam from the steam-discharge ring.

15 Claims, 3 Drawing Sheets

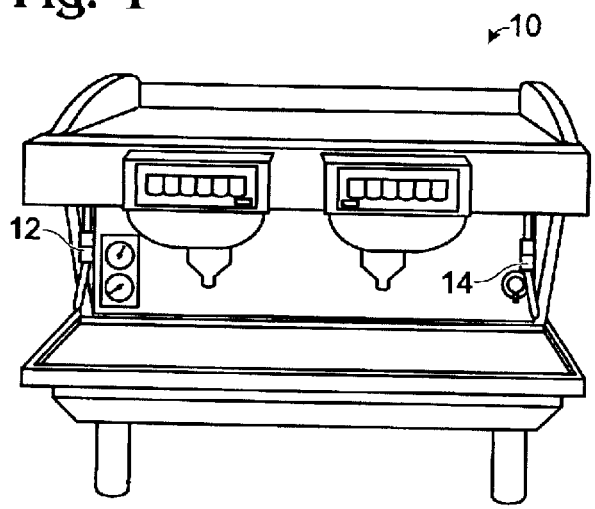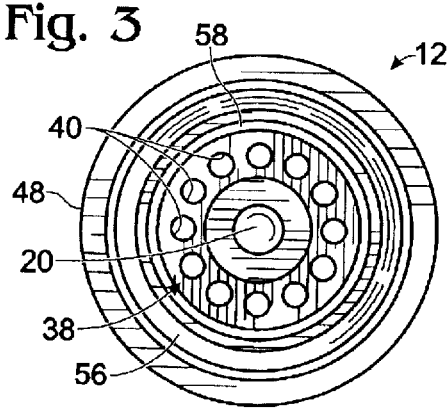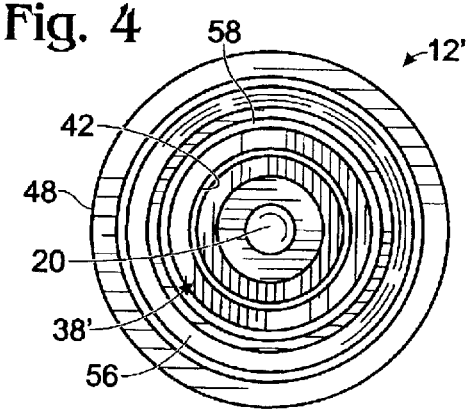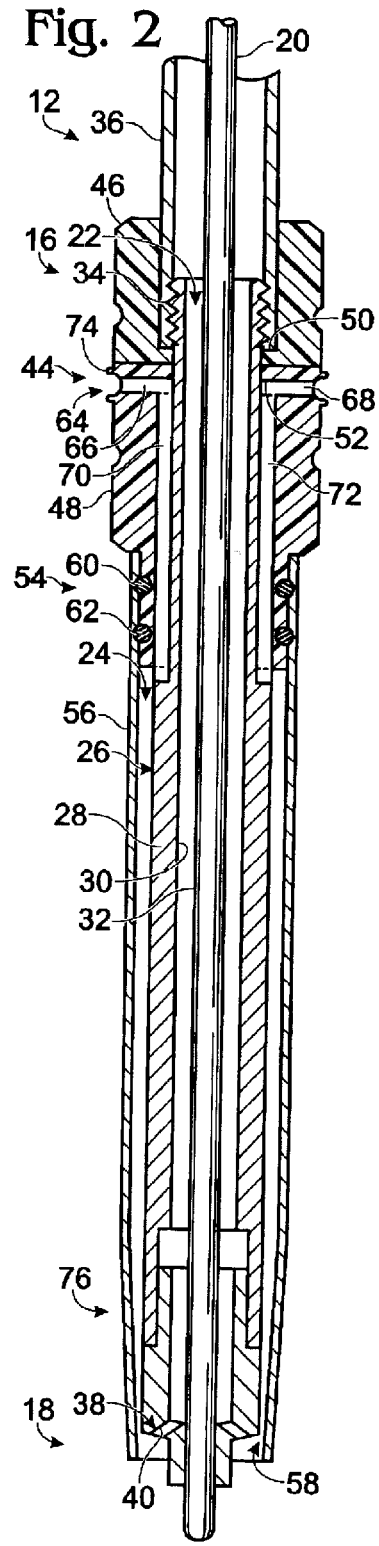

DEVICE FOR PREPARING MILK FROTH FOR CAPPUCCINO

CROSS REFERENCE TO RELATED APPLICATIONS

This application is based upon and claims priority under 35 U.S.C. § 119 from the following co-pending U.S. provisional patent applications, which are incorporated herein by this reference, in their entirety and for all purposes: DEVICE FOR PREPARING MILK FROTH FOR CAPPUCCINO, Serial No. 60/350,306, filed Jan. 16, 2002; and DEVICE FOR PREPARING MILK FROTH FOR CAPPUCCINO, Serial No. 60/374,108, filed Apr. 19, 2002.

TECHNICAL FIELD

The present invention relates to beverage preparation devices. In particular, the invention relates to a device configured for heating and frothing dairy liquids such as milk.

BACKGROUND OF THE INVENTION

Many popular beverages such as cappuccino are made with frothed milk. One known method of producing milk froth is to aerate the milk with a combination of steam and air. This has traditionally been accomplished by having a skilled operator maneuver the end of a steam dispensing tube at the surface of milk in a container so as to force mixture of the milk and steam with the surrounding air. Accordingly, the amount and character of froth has previously been limited by the skill of the operator.

Some steam tubes have been outfitted with air-dispensing units. These tubes may be able to produce milk froth below the surface of milk because air is drawn below the surface. However, the amount and character of froth produced with such tubes has been inconsistent due to the mechanism through which such tubes typically apply steam and air to the milk.

Some steam tubes have also been less than optimal because the operator is forced to carefully monitor the temperature of the milk being frothed with no accurate method for doing so. This may distract him/her from the primary task of frothing the milk.

SUMMARY OF THE INVENTION

A device for heating and frothing a beverage, the device including an elongate frothing wand that includes a generally tubular external sleeve, an inner core within the external sleeve, wherein the inner core defines a steam conduit configured to pass steam from a supply end of the frothing wand to an expulsion end of the frothing wand, a steam-discharge ring in fluid communication with the steam conduit and configured to eject steam into the beverage, an annular airway defined by the external sleeve and the inner core, wherein the airway is configured to draw air from the supply end to the expulsion end of the frothing wand, and an air-discharge ring in fluid communication with the airway and concentrically aligned with the steam-discharge ring, wherein the air-discharge ring is configured to direct air into the beverage upon ejection of steam from the steam-discharge ring.

BRIEF DESCRIPTION OF THE DRAWINGS

FIG. 1 is an isometric view of a beverage preparation device that includes a pair of frothing wands, each configured to mix air and steam into a beverage to froth the beverage.

FIG. 2 is a cross-sectional view of one of the frothing wands of FIG. 1, the frothing wand being constructed in accordance with an embodiment of the invention.

FIG. 3 is a bottom view of the expulsion end of the frothing wand of FIG. 2.

FIG. 4 is a bottom view of the expulsion end of an alternative frothing wand configured to mix air and steam into a beverage in accordance with an alternative embodiment of the invention.

DETAILED DESCRIPTION OF THE INVENTION

Figures 5, 6:
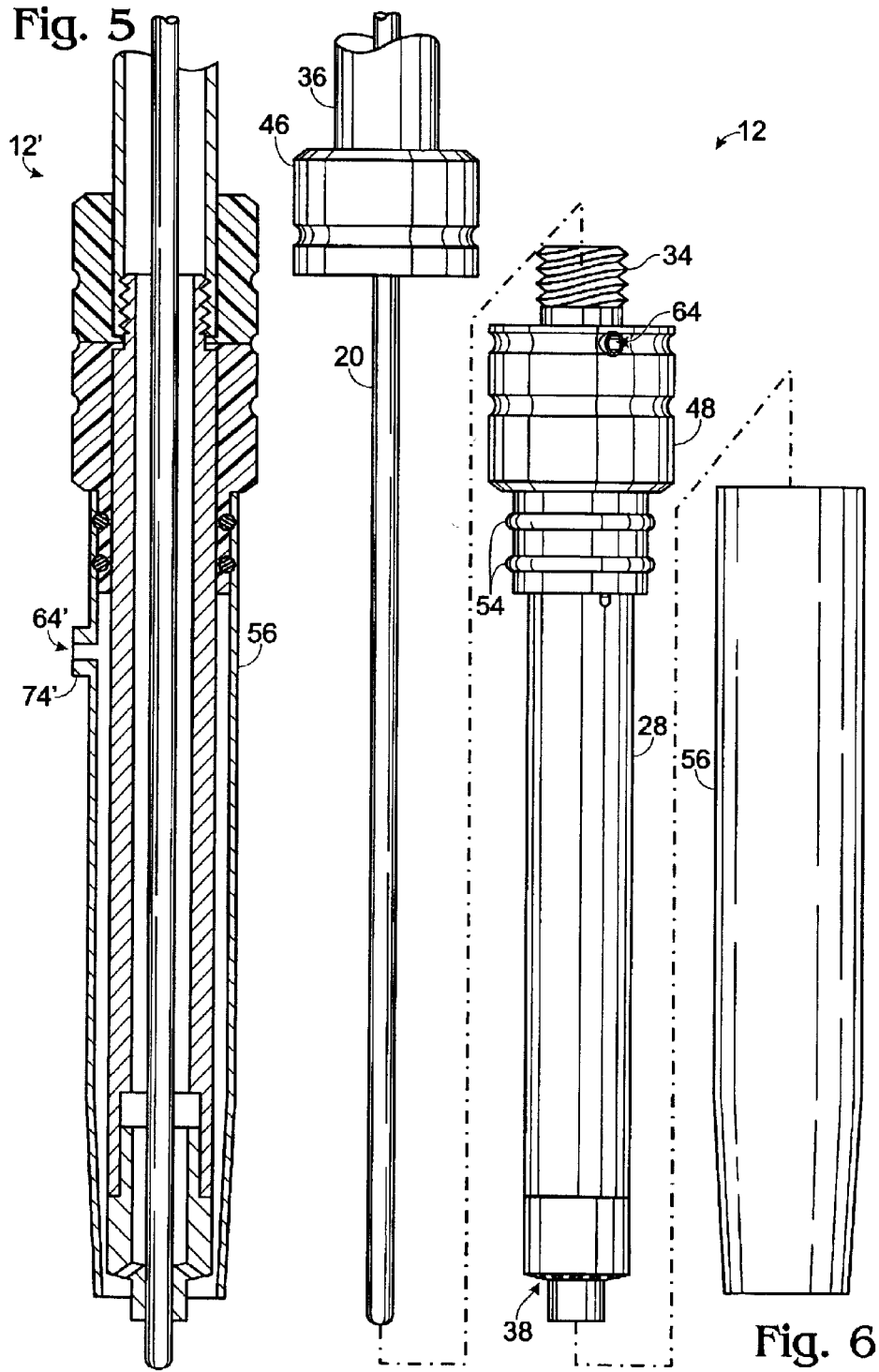
FIG. 5 is a cross-sectional view of a frothing wand constructed according to another embodiment of the invention.
FIG. 6 is a partially-exploded elevational view of the frothing wand of FIG. 2.

FIG. 1 shows a beverage preparation device 10 having a pair of frothing wands 12 and 14, each of which may be used to heat and/or froth milk. Each frothing wand may be configured to eject steam and/or air into a volume of milk in order to bring about the heating and frothing effect. In particular, steam and air may be ejected into the milk so that the milk becomes aerated, and thus frothed or foamed.

As shown in FIG. 1, the beverage preparation device may include plural wands, such as wands 12 and 14. When plural wands are included, the wands may be similarly configured or individually configured, for example, to produce different characters of froth or foam. It is also within the scope of the invention for beverage preparation devices to be configured with a single frothing wand, or three or more frothing wands.

FIG. 2 is a cross-sectional view of frothing wand 12, which has opposing end regions, referred to herein as a supply end region 16 and an expulsion end region 18. As shown in the depicted embodiment, the frothing wand may include three concentrically aligned layers. At its center, the wand may include a temperature measuring instrument 20 that is aligned with a longitudinal axis of the wand. In the middle layer, an annular steam conduit 22 may be concentrically aligned with the temperature measuring instrument. An annular airway 24 may be concentrically aligned with the annular steam conduit to form the outermost layer. Of course, it is within the scope of the invention to use other configurations, such as configurations that utilize non-annular airways and/or steam conduits. In some embodiments, for example, the temperature measuring instrument may be left out of the device entirely, which consequently may give the steam conduit a cylindrical geometry.

The frothing wand may include a temperature-measuring instrument 20 that is positioned near the center of the frothing wand. In some embodiments, the temperature measuring instrument may be positioned differently, or not included. The temperature-measuring instrument may be a thermometer, thermistor, thermocouple, or other suitable instrument configured to measure temperatures. Measured temperatures may be indicated via a visual display and/or other visible or audible mechanism, and may be used to automatically control operation of the beverage preparation device.

The temperature-measuring instrument may be configured to provide the beverage preparation device with an indication of a real-time temperature of the frothed milk.

Such real-time temperature information may be used to automatically control the temperature of the milk, or to determine the frothing effect of the wand. Steam may be ejected into the milk, causing the temperature of the milk to increase until the milk reaches a specified temperature, at which point the beverage-producing device may automatically cease steam ejection.

An inner core 26 may define steam conduit 22, which is configured to pass steam from the supply end region of the wand to the expulsion end region of the wand. Accordingly, inner core 26 typically includes a generally tubular assembly 28 configured to transport steam. The tubular assembly may have a variety of shapes, including that of a cylinder, cone, cuboid, prism, etc. It also is within the scope of the invention to construct the tubular assembly from one or more constituent parts, which, in turn, may be constructed from a variety of materials including plastic, metal, metal alloy, glass, rubber, and/or a combination of these or other suitable materials. The construction material typically has a high melting temperature so that steam and/or frothed beverages, as well as other substances, will not degrade the tubular assembly. The construction material also typically is at least substantially inert, and thus will not impose undesirable flavor to beverages, or to the steam passing through the steam conduit. In order to avoid mechanical alterations that may lead to structural failure, the tubular assembly typically is appropriately dimensioned to provide adequate support against pressurized steam being passed through the steam conduit, and/or other mechanical strains.

The interior surface of inner core 26 may serve as a lateral boundary to steam conduit 22. Therefore, the geometry of the steam conduit may be at least partially determined by the geometry of the tubular assembly. Depending on the configuration of the interior surface, the steam conduit may have an outer boundary 30 in the shape of a cylinder, cone, cuboid, prism, etc. The steam conduit may be additionally defined by an inner boundary 32, such as that defined by temperature measuring instrument 20, that may have a similar or different shape than the outer boundary. The volume between the outer boundary and the inner boundary typically has an annular cross section. As used herein, annular is used to describe a ring-like cross section whether the ring is circular, rectangular, or some other shape or combination of shapes.

As depicted in FIG. 2, inner core 26 may include a coupling mechanism 34, configured to facilitate connection to a steam supply 36 of beverage preparation device 10. The coupling mechanism may include threads, clamps, grooves, quick connect mechanisms, or other suitable fasteners complementarily configured to connect with steam supply 36. Coupling mechanism 34 typically is configured to create an airtight seal connecting steam supply 36 and steam conduit 22. To facilitate maintenance and cleaning, the coupling mechanism may allow easy de-coupling and re-coupling of the frothing wand from the steam supply.

When coupled to steam supply 36, steam conduit 22 may receive steam (and/or other fluids) ejected from the steam supply. Steam conduit 22 is typically configured to deliver the steam from the supply end region of the wand to a steam-discharge ring 38 at the expulsion end region of the wand. The steam-discharge ring may include any number of steam-ejection orifices. FIG. 3 shows a plan view of an embodiment of frothing wand 12 in which the steam-discharge ring has a plurality of radially dispersed steam ejection orifices 40. In FIG. 4, an alternative frothing wand 12' is shown, such frothing wand including a steam-discharge ring 38' with a continuous annular opening 42.

The steam coming from the steam supply is typically pressurized, and thus is forced out of the steam-discharge ring. Several factors contribute to the manner by which the steam is ejected from the steam-discharge ring. For example, increasing the pressure of the steam at the steam supply typically increases the volume and velocity of steam ejection. Increasing the number and/or size of steam ejection orifices of the steam-discharge ring typically increases the volume of ejected steam while decreasing the velocity of steam ejection.

Figure 7:
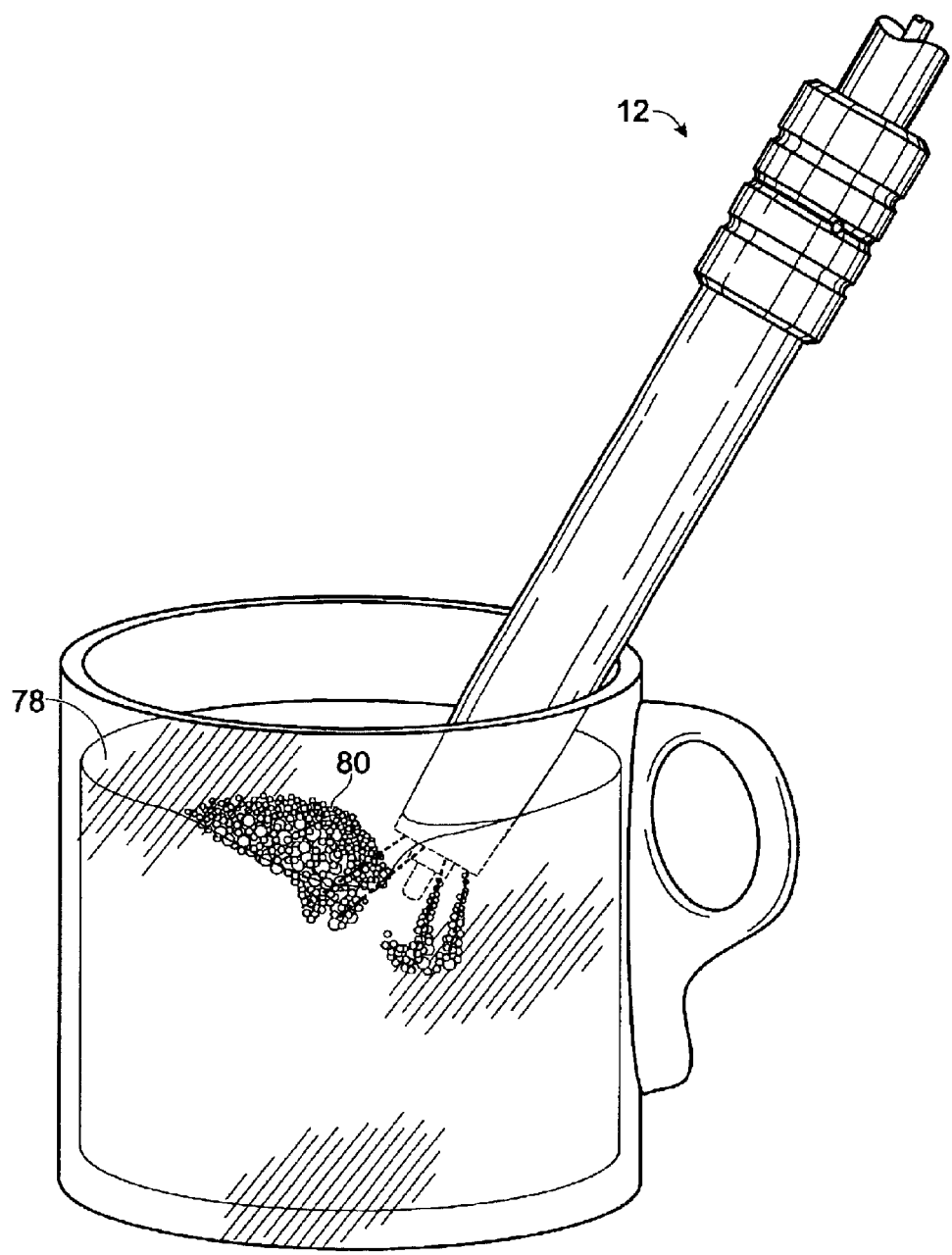
FIG. 7 is an isometric view showing the frothing wand of FIG. 2 during frothing of a beverage.

The steam-discharge ring may be configured to eject steam away from a longitudinal axis of the wand. For example, as depicted in FIG. 7, the individual steam ejection orifices may be aimed away from the longitudinal axis so that steam is effectively forced out of the orifices and away from the longitudinal axis. Aiming steam away from the longitudinal axis may increase the accuracy of temperature measurements taken with temperature measuring instrument 20, which typically extends past the steam-discharge ring. Aiming the steam away from the longitudinal axis may also facilitate the steam mixing with air, which helps produce a frothing effect when applied to dairy liquids. It is also within the scope of the invention to aim the orifices parallel to the longitudinal axis, or any combination of different angles.

Still referring to FIG. 2, wand 12 may include a handle assembly 44. The handle assembly may include one or more handle portions such as upper handle portion 46 and lower handle portion 48. As shown, upper handle portion 46 may be configured to fit around steam supply 36. The upper handle portion may include an upper flange 50 configured to abut the steam supply, and to set the position of the upper handle portion relative to the steam supply. Similarly, the lower handle portion may be configured to fit around tubular assembly 28, and may include a lower flange 52 configured to abut the tubular assembly and set the position of the lower handle relative to the tubular assembly. The handle assembly may be shaped so as to limit rotation about the steam supply, tubular assembly, or both. Such a configuration, for example, may allow twisting of the handle assembly to twist the underlying structure of the wand. As shown, when the upper handle is positioned around the steam supply and the lower handle is positioned around the tubular assembly, the handles may be drawn together as the tubular assembly is coupled to the steam supply (such as by twisting the lower handle, which in turn may twist the tubular assembly in relation to the steam supply). A gasket or other sealing mechanism (not shown) may be placed at the junction between the upper and lower handles to improve the seal between the steam supply and the wand.

The handle assembly is typically constructed from material that is a poor thermal conductor and has a high melting temperature. The configuration of the handle assembly typically allows an operator of the beverage preparation device to grip and manipulate the frothing wand before, after, and during beverage preparation. The handle assembly also may facilitate disassembly of the frothing wand for repair and/or cleaning. It is within the scope of the invention to position a handle assembly along any part of the frothing wand, although the junction of the steam supply and tubular assembly is shown.

Frothing wand 12 may include plural contact surfaces 54 collectively configured to removably secure an external sleeve 56 in concentric alignment with inner core 26. As described herein, the external sleeve may define an annular airway 24 configured to direct air to an air-discharge ring 58. As shown in FIG. 2, plural contact surfaces, such as provided by upper seal ring 60 and lower seal ring 62 may be positioned on the handle assembly to mount the external sleeve on the inner core. Of course, it is within the scope of the invention to use contact surfaces other than rings. The contact surfaces may create a seal between the handle assembly and the external sleeve. In the present illustration, the contact surfaces are spaced apart from one another on the handle assembly. Plural contact surfaces spaced apart from one another may promote a good seal. Furthermore, using such spaced-apart contact surfaces may prevent a contact surface from acting as an axis upon which the external sleeve may pivot. Thus, the external sleeve may be secured in a fixed position relative to the rest of the frothing wand. While shown as two discrete rings, it is within the scope of the invention to use a single wide element that effectively provides plural contact surfaces by providing a relatively large contact area. It is understood that the contact surfaces may be part of the handle assembly, the external sleeve, or a different component.

Although the external sleeve may be more permanently secured to the rest of the frothing wand, it typically is configured to be readily secured and unsecured. In such configurations, the external sleeve may be easily removed, and the frothing wand may be used to heat a beverage without frothing. Easy removal also facilitates cleaning and repair. For example, the external sleeve may be easily removed after a beverage of one flavor is prepared, so as to minimize the risk of imparting an undesired flavor to a subsequently prepared beverage. In addition, several different external sleeves individually configured to accommodate specific functions may be interchangeably coupled to the frothing wand, thus diversifying the utility of the frothing wand.

External sleeve 56 is typically a generally tubular component. The sleeve may have a circular cross section, although virtually any other shape is possible. When secured to inner core 26, the external sleeve may define an outer lateral boundary of annular airway 24, for which the inner core may define an inner lateral boundary. The shape of the annular airway depends on the geometries of the external sleeve and the inner core. The annular airway provides a path by which air may be moved from the supply end region of the frothing wand to the expulsion end region of the frothing wand.

Air may enter the annular airway via an air inlet 64 spaced apart from the expulsion end region of the frothing wand. The air inlet may include one or more orifice, each of which may provide an air ingress. Positioning the air inlet in spaced relation to the expulsion end region of the frothing wand permits air to enter the annular airway even when the expulsion end region of the frothing wand is submerged in milk (as shown in FIG. 7). As shown in FIG. 2, the air inlet may be integrated into the handle assembly. Handle orifices 66 and 68 respectively lead to intermediate airways 70 and 72, which in turn lead to the annular airway. Of course the air inlet may be positioned at other locations on the frothing wand. For example, FIG. 5 shows an air inlet 64' located on the external sleeve 56. Although depicted with a single orifice in FIG. 5, it should be understood that the air inlet may include a plurality of orifices, regardless of its positioning.

Turning back to FIG. 2, an air inlet guard 74 may be provided to help reduce air inlet obstruction. Air inlet guard 74 may include one or more raised rims surrounding the periphery of the air inlet. The air inlet guard may alternatively, or additionally, include a series of bumps or other features configured to protect the air inlet. Reducing air inlet obstruction increases the efficiency of airflow into the air inlet and through the annular airway to the air-discharge ring. Therefore, the air inlet guard is typically configured to reduce bubbles or other obstructions from blocking air flow into the air inlet. Of course, an air inlet guard 74' may also be provided when the air inlet is located on the external sleeve, as shown in FIG. 5.

As depicted in FIG. 2, the external sleeve may include a tapered portion 76, at which the cross-sectional area of the annular airway may decrease, moving from the supply end region to the expulsion end region of the frothing wand. When steam is discharged via steam-discharge ring 38, the pressure at the air-discharge ring decreases. The air-discharge ring is in fluid communication with the annular airway, and air from the airway is drawn to the area of lower pressure. This creates a suction effect that draws air toward the air inlet at the supply end of the frothing wand. As the air travels through the tapered portion of the annular airway, a Venturi effect further promotes its passage through the expulsion end of the frothing wand. Therefore, air may be drawn to the expulsion end of the frothing wand and mix with steam expelled from the steam-discharge ring. Because air is drawn from the supply end of the frothing wand, the expulsion end of the frothing wand may be submerged into a beverage, thus allowing frothing of the beverage to occur below the surface of the beverage.

The external sleeve may be constructed from a variety of materials including plastic, metal, metal alloy, glass, rubber, and/or a combination of these or other materials. The external sleeve is typically constructed from a relatively inert material with a high melting temperature so that steam and/or beverages will not degrade the external sleeve. In some embodiments, the sleeve is at least partially transparent, which allows a user to easily identify if the sleeve should be removed for cleaning, if for example, milk has dried under the sleeve.

FIG. 6 shows a partially-exploded view of frothing wand 12 that demonstrates assembly/disassembly of the frothing wand. As depicted, upper handle portion 46 may be positioned around steam supply 36. When present, the upper flange (not shown) limits the distance the upper handle may be moved upward. Temperature measuring instrument 20 may extend through the steam supply and/or the upper handle. Although not shown, it should be understood that the temperature-measuring instrument may connect to an input mechanism configured to receive temperature measurements. Such a connection may be variously located, and the temperature-measuring instrument may be disconnected from the frothing wand at the connection.

Lower handle portion 48 may be positioned around the tubular assembly 28. The distance the lower handle may be moved downward may be limited by the lower flange (not shown). Coupling mechanism 34 may be used to connect the tubular assembly to the steam supply, thus causing the upper handle portion and the lower handle portion to abut one another. The coupling mechanism may include a threaded rod mated to a receiving portion of the steam supply. It should be understood, however, that other coupling mechanisms may be used, and the depicted threads are provided for exemplary purposes.

The lower handle may include a plurality of contact surfaces 54 configured to hold external sleeve 56 in concentric alignment with the remainder of the frothing wand. The external sleeve may be slid over the contact surfaces, thus creating a seal that facilitates the passage of air from air inlet 64 to the air-discharge ring, where the air may be expelled and mix with expelled steam in a beverage such as milk. Such spaced-apart contact surfaces provide a stable connection for the external sleeve, while at the same time allowing the sleeve to be easily connected and disconnected.

FIG. 7 shows frothing wand 12 inserted into a beverage 78 while steam and air are being ejected into the beverage. As shown, the steam and air combination creates a frothing effect 80. According to the present invention, the frothing wand may be specifically configured to produce a desired character of froth. For example, the ratio of steam to air and the manner by which they mix may be selected by the particular configuration of the steam-discharge ring, the air-discharge ring, and/or other parts of the frothing wand. In particular, either ring may be aimed differently, configured to eject more or less respective fluid, and/or otherwise specifically configured.

Furthermore, while the present embodiment of the invention has been particularly shown and described with particularity, those skilled in the art will understand that many variations may be made therein without departing from the spirit and scope of invention defined in the following claims. The description thus should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this, or a later application. Where the claims recite "a" or "a first" element or the equivalent thereof, such claims should be understood to include incorporation of one or more such elements, neither requiring nor excluding two or more such elements.

We claim:

1. A device for heating and frothing a beverage, the device including an elongate frothing wand comprising:
   a generally tubular external sleeve;
   an inner core within the external sleeve, wherein the inner core defines a steam conduit configured to pass steam from a supply end of the frothing wand to an expulsion end of the frothing wand;
   a steam-discharge ring in fluid communication with the steam conduit and configured to eject steam into the beverage;
   an annular airway defined by the external sleeve and the inner core, wherein the airway is configured to draw air from the supply end to the expulsion end of the frothing wand; and
   an air-discharge ring in fluid communication with the airway and concentrically aligned with the steam-discharge ring, wherein the air-discharge ring is configured to direct air into the beverage upon ejection of steam from the steam-discharge ring, wherein the steam-discharge ring includes a plurality of steam-ejection orifices.

2. The device of claim 1, wherein the inner core includes a temperature measuring instrument configured to measure a temperature of the beverage.

3. The device of claim 1, wherein the steam-discharge ring is configured to direct steam away from a longitudinal axis of the frothing wand.

4. The device of claim 3, wherein a temperature measuring instrument is aligned with the longitudinal axis of the frothing wand.

5. A device for heating and frothing a beverage, the device including an elongate frothing wand comprising:
   a generally tubular external sleeve;
   an inner core within the external sleeve, wherein the inner core defines a steam conduit configured to pass steam from a supply end of the frothing wand to an expulsion end of the frothing wand;
   a steam-discharge ring in fluid communication with the steam conduit and configured to eject steam into the beverage;
   an annular airway defined by the external sleeve and the inner core, wherein the airway is configured to draw air from the supply end to the expulsion end of the frothing and
   an air-discharge ring in fluid communication with the airway and concentrically aligned with the steam-discharge ring, wherein the air-discharge ring is configured to direct air into the beverage upon ejection of steam from the steam-discharge ring;
   wherein the frothing wand includes an air inlet spaced apart from the expulsion end of the frothing wand, wherein the air inlet is configured to supply the airway with air, and wherein the frothing wand includes an air inlet guard configured to reduce air inlet obstruction.

6. The device of claim 5, wherein the air inlet is formed in the external sleeve.

7. The device of claim 5, wherein the air inlet includes a plurality of orifices collectively configured to supply the airway with air.

8. The device of claim 5, wherein the air inlet guard includes a raised rim substantially surrounding the air inlet.

9. A device for heating and frothing a beverage, the device including an elongate frothing wand comprising:
   a generally tubular external sleeve;
   an inner core within the external sleeve, wherein the inner core defines a steam conduit configured to pass steam from a supply end of the frothing wand to an expulsion end of the frothing wand;
   a steam-discharge ring in fluid communication with the steam conduit and configured to eject steam into the beverage;
   an annular airway defined by the external sleeve and the inner core, wherein the airway is configured to draw air from the supply end to the expulsion end of the frothing wand;
   an air-discharge ring in fluid communication with the airway and concentrically aligned with the steam-discharge ring, wherein the air-discharge ring is configured to direct air into the beverage upon ejection of steam from the steam-discharge ring; and
   a handle assembly at the supply end of the frothing wand, the handle assembly configured to provide a thermally insulated gripping surface on the frothing wand.

10. The device of claim 9, wherein the handle assembly includes plural contact surfaces collectively configured to removably secure the external sleeve in concentric alignment with the inner core.

11. The device of claim 10, wherein the handle assembly includes an air inlet configured to supply the airway with air.

12. The device of claim 11, wherein the air inlet includes a plurality of orifices collectively configured to supply the airway with air.

13. The device of claim 12, wherein the orifices radially distributed about a perimeter of the handle assemble.

14. The device of claim 11, wherein the handle assembly includes a raised rim configured to surround the air inlet.

15. A device for heating and frothing a beverage, the device including an elongated frothing wand comprising:

a generally tubular external sleeve;

an inner core within the external sleeve and having a temperature-measuring instrument configured to measure a temperature of the beverage, wherein the inner core defines a steam conduit configured to pass steam from the supply end of the frothing wand to the expulsion end of the frothing wand;

a steam-discharge ring in fluid communication with the steam conduit and configured to eject steam into the beverage;

an annular airway defined by the external sleeve and the inner core, wherein the airway is configured to draw air from the supply end to the expulsion end of the frothing wand;

an air-discharge ring in fluid communication with the airway and concentrically aligned with the steam-discharge ring, the air-discharge ring being configured to direct air into the beverage; and a handle assembly at the supply end of the frothing wand, the handle assembly being configured to provide a thermally-insulated gripping surface of the frothing wand, and including plural contact surfaces collectively configured to removably secure the external sleeve in concentric alignment with the inner core and an air inlet configured to supply the airway with air.

* * * * *